United States Patent
Contratto et al.

(10) Patent No.: US 9,464,684 B2
(45) Date of Patent: Oct. 11, 2016

(54) VIBRATION CONTROL SYSTEM WITH VIRTUAL END STOPS

(75) Inventors: Michael S. Contratto, Chillicothe, IL (US); William T. Larkins, Manchester, NH (US)

(73) Assignee: Caterpillar Inc., Peoria, IL (US)

( * ) Notice: Subject to any disclaimer, the term of this patent is extended or adjusted under 35 U.S.C. 154(b) by 2138 days.

(21) Appl. No.: 12/318,250

(22) Filed: Dec. 23, 2008

(65) Prior Publication Data

US 2010/0161182 A1 Jun. 24, 2010

(51) Int. Cl.
*G06F 17/00* (2006.01)
*F16F 15/06* (2006.01)
*F16F 15/02* (2006.01)
*F16F 15/00* (2006.01)

(52) U.S. Cl.
CPC ............ *F16F 15/002* (2013.01); *F16F 15/02* (2013.01); *F16F 15/06* (2013.01); *G06F 17/00* (2013.01)

(58) Field of Classification Search
CPC .......... G06F 17/00; F16F 15/06; F16F 15/02
USPC ............. 296/63, 65.1, 65.11, 68.1; 248/157, 248/163.2, 420, 424, 448–449, 559; 280/707, 840; 267/64.12, 131–136, 267/140.14–140.15, 164, 167, 169, 171, 267/289, 291, 293
See application file for complete search history.

(56) References Cited

U.S. PATENT DOCUMENTS

| | | | |
|---|---|---|---|
| 4,468,050 A | 8/1984 | Woods et al. | |
| 4,821,849 A * | 4/1989 | Miller | 188/280 |
| 5,276,622 A | 1/1994 | Miller et al. | |
| 5,276,623 A | 1/1994 | Wolfe | |
| 5,346,170 A * | 9/1994 | Schmidt et al. | 248/550 |
| 5,582,385 A | 12/1996 | Boyle et al. | |
| 5,652,704 A | 7/1997 | Catanzarite | |
| 5,712,783 A | 1/1998 | Catanzarite | |
| 5,732,370 A | 3/1998 | Boyle et al. | |
| 5,908,456 A | 6/1999 | Wahlers | |
| 5,964,455 A | 10/1999 | Catanzarite et al. | |
| 6,049,746 A | 4/2000 | Southward et al. | |
| 6,082,715 A * | 7/2000 | Vandermolen | 267/131 |
| 6,264,163 B1 * | 7/2001 | Ivarsson | 248/588 |
| 6,371,459 B1 | 4/2002 | Schick et al. | |
| 6,382,604 B2 | 5/2002 | St. Clair | |
| 6,424,894 B2 | 7/2002 | St. Clair | |
| 6,513,799 B2 | 2/2003 | St. Clair | |
| 6,583,596 B2 * | 6/2003 | Nivet et al. | 318/626 |
| 6,732,033 B2 | 5/2004 | LaPlante et al. | |
| 6,886,650 B2 | 5/2005 | Bremner | |
| 6,904,344 B2 | 6/2005 | LaPlante et al. | |
| 6,923,298 B2 * | 8/2005 | Tanner | 188/267 |
| 7,213,690 B2 * | 5/2007 | Tanner | 188/287 |

(Continued)

*Primary Examiner* — Faris Almatrahi
*Assistant Examiner* — Majdi Alsomiri
(74) *Attorney, Agent, or Firm* — Finnegan, Henderson, Farabow, Garrett & Dunner, LLP

(57) ABSTRACT

A component vibration control system is disclosed. The vibration control system includes a first physical end stop, a second physical end stop, a damper assembly, a position sensor configured to determine a component position, and a processor in communication with the position sensor and the damper assembly. The processor is configured to set a first virtual end stop position, regulate a damping force of the damper assembly as the component moves toward the first virtual end stop position, and determine a second virtual end stop position based on a first distance of the component from a set position.

20 Claims, 6 Drawing Sheets

(56) References Cited

U.S. PATENT DOCUMENTS

| | | | |
|---|---|---|---|
| 7,287,760 B1* | 10/2007 | Quick et al. | 280/5.512 |
| 7,546,215 B2* | 6/2009 | Muhammad et al. | 702/94 |
| 7,878,312 B2* | 2/2011 | Hiemenz et al. | 188/377 |
| 2002/0011699 A1* | 1/2002 | St.Clair | 267/131 |
| 2004/0124049 A1* | 7/2004 | St. Clair et al. | 188/266 |
| 2009/0125194 A1* | 5/2009 | Haller et al. | 701/48 |

* cited by examiner

US 9,464,684 B2

VIBRATION CONTROL SYSTEM WITH VIRTUAL END STOPS

TECHNICAL FIELD

The present disclosure is directed to a vibration control system, and more particularly, a vibration control system with virtual end stops.

BACKGROUND

Mobile machines such as, for example, wheel tractor scrapers, dozers, motor graders, wheel loaders, and other types of equipment are used to perform a variety of earthmoving tasks. When performing such tasks, the mobile machine and its components may encounter vibrations and movements introduced by the vehicle itself and external inputs, such as dips and bumps of a worksite surface. An operator of the mobile machine may experience such vibrations, which may cause discomfort and difficulty controlling the vehicle. In order to improve operator comfort and vehicle control, for example, machines may typically employ suspension systems to help isolate the operator from the vibrations and various movements that may be experienced during machine operation. The suspension systems typically include a spring to support the machine component and a damper to control resonant motion of the seat.

In some instances, an initial vibration or acceleration caused by the vehicle or an external input may be isolated by the suspension system. However, subsequent and excess motion on the suspension may still disrupt the operator and make the mobile machine more difficult to control.

One method for improving the isolation of excess motion on a suspension is described in U.S. Pat. No. 5,276,622 (the '622 patent) to Miller et al., issued on Jan. 4, 1994. The '622 patent describes an end stop control method to control operation of an isolation system having an adjustable damper assembly. The end stop control method includes calculating a correct damping for sensed conditions based on kinematics of a suspension system. The damping system increases damping as the system approaches end stop limits. When a moving body, such as a seat, is likely to meet or exceed the end stop limits, a higher level damping routine is used to prevent harsh contact with the end stop limits.

Although the end stop method of the '622 patent may provide improved isolation of motion on a seat suspension, it may have limitations. For example, while the end stop method may isolate an initial disruption to the seat, it may not be able to adequately prevent operator discomfort or improve operator control of a machine in response to subsequent oscillations following the initial disruption. As a result, the seat suspension may undergo excess motion or "rattling," making it difficult for the operator to maintain control of the machine and possibly causing operator discomfort.

The vibration control system of the present disclosure is directed towards improvements to the existing technology.

SUMMARY OF THE DISCLOSURE

One aspect of the present disclosure is directed to a component vibration control system. The vibration control system may include a first physical end stop, a second physical end stop, a damper assembly, a position sensor configured to determine a component position, and a processor in communication with the position sensor and the damper assembly. The processor may be configured to set a first virtual end stop position, regulate damping of the damper assembly as the component moves toward the first virtual end stop position, and determine a second virtual end stop position as a function of a first distance of the component position from a set position.

Another aspect of the present disclosure is directed to a vibration control method including setting a first virtual end stop position, regulating damping as a component moves toward the first virtual end stop position, and determining a second virtual end stop position as function of a first distance of a component position from a set position.

DETAILED DESCRIPTION

Figure 1:
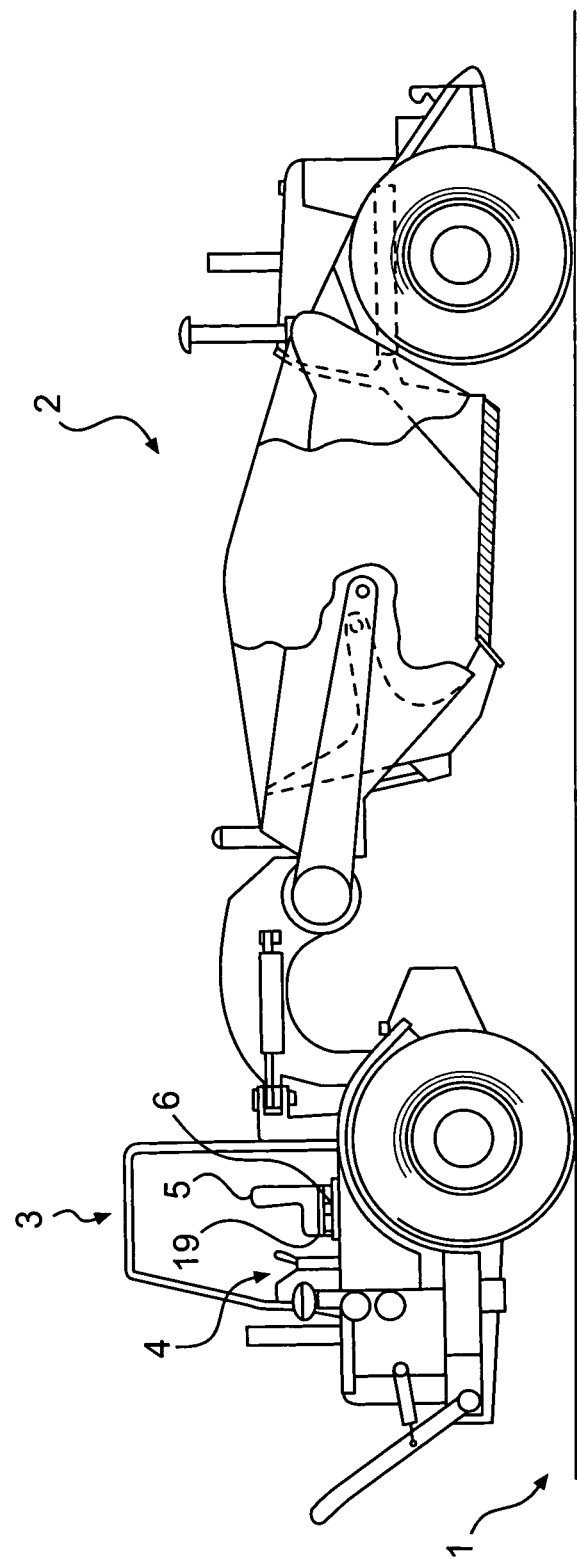
FIG. 1 is a pictorial illustration of an exemplary disclosed machine according to an exemplary disclosed embodiment.

FIG. 1 illustrates a worksite 1 with an exemplary mobile machine 2, such as a wheel tractor scraper, performing a predetermined task. Worksite 1 may include, for example, a mine site, a landfill, a quarry, a construction site, or any other type of worksite. The predetermined task may be associated with altering the current geography at worksite 1 and may include, for example, a grading operation, a scraping operation, a leveling operation, a bulk material removal operation, or any other type of geography-altering operation at worksite 1.

The present disclosure may be used on any machine or component, such as mobile machine 2, to reduce or dampen vibrations. Such uses may include stationary machine or component mounting systems, mobile machine suspension systems, cab mounting suspension systems, engine mounting suspension systems, or any other machine or component where damping of vibrations is beneficial. In order to fully describe the features of the present disclosure, the example of a mobile machine seat suspension system will be discussed below. It is understood, however, that the details of the disclosed seat suspension system will be applicable to the use of such a vibration control system on various other machines or components.

Machine 2 may include a cab 3 which may be occupied by a machine operator. Cab 3 may include a control module 4 configured to permit the operator to control machine 2. A seat 5 for the operator may be housed within cab 3. Seat 5 may be readily adjusted to a set position 19 from control module 4 so that the operator may comfortably and effectively control machine 2. This position may be a "ride height" position, which is understood to be an operator selected position of seat 5 set at an appropriate height for easy and effective control of control module 4 by the operator. A seat suspension control system 6 may be associated with seat 5 and may be configured to isolate seat 5, and thus the operator, from vibrations and movements introduced by machine 2. Such vibrations and movements of machine 2 may be caused by, for example, acceleration of machine 2 or external inputs from worksite 1, such as, by dips, bumps, and rough terrain.

Figure 2:
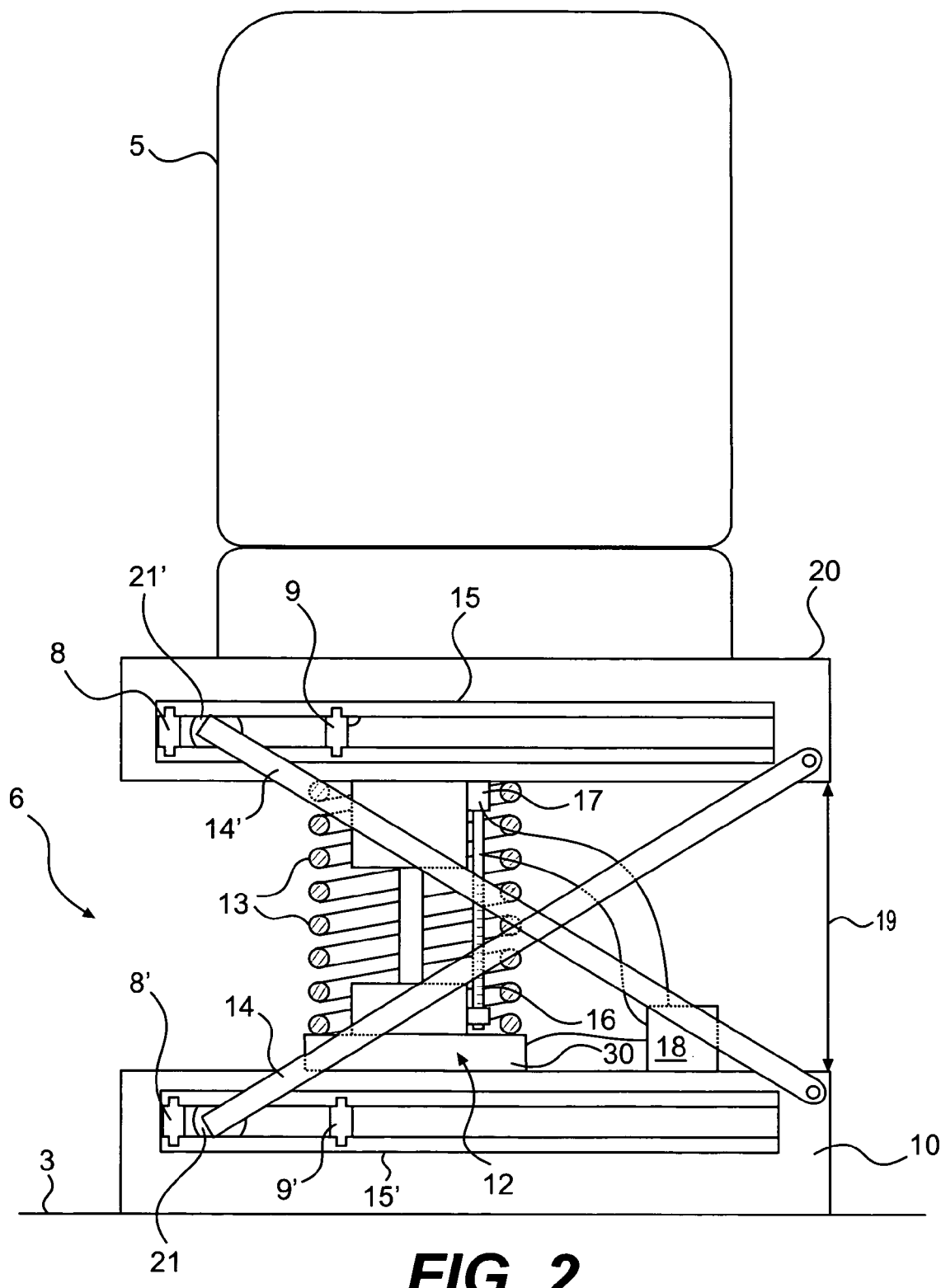
FIG. 2 is a diagrammatic illustration of a vibration control system according to an exemplary disclosed embodiment.

An exemplary embodiment of seat suspension control system 6 is shown in FIG. 2. Seat 5 may be mounted on a seat support 20, which may be coupled to a base 10 mounted to a floor of cab 3. Additionally, seat support 20 and base 10 may be separated by a preselected distance based on set position 19. As explained above, set position 19 may be associated with the operator selected ride height position. Seat support 20 and base 10 may both include a travel rail 15, 15' and a travel guide 14, 14'. For example, travel guide 14 may be engaged with seat support 20 and movably engaged with travel rail 15' of base 10, and a travel guide 14' may be engaged with base 10 and movably engaged with travel rail 15 of seat support 20. When machine 2 experiences vibrations or movements, seat support 20 and base 10 may move relative to each other as a roller 21 of travel guide 14 and a roller 21' of travel guide 14' may displace along travel rail 15' and travel rail 15, respectively. Although not shown in FIG. 2, a similar arrangement of travel guides 14, 14' and travel rails 15, 15' may be associated with both a front and rear side of seat 5. Other arrangements for physically guiding movement of seat 5 may be used.

Seat suspension control system 6 may isolate the vibration and subsequent movement between seat support 20 and base 10. A first physical end stop 8 and a second physical end stop 9 may be associated with seat support 20, and a first physical end stop 8' and a second physical end stop 9' may be associated with base 10. First physical end stops 8, 8' and second physical end stops 9, 9' may be positioned along travel rails 15, 15' at positions which define the maximum and minimum separation distance between seat 5 and base 10. Seat suspension control system 6 may include a position sensor 16 configured to determine a vertical position of seat 5. A speed sensor 17 may also be associated with seat suspension control system 6 and may be configured to detect a seat 5 velocity. Seat suspension control system 6 may further include a spring 13 coupling seat support 20 and base 10, a seat damper assembly 12, and a processor 18 in communication with seat damper assembly 12, position sensor 16, and speed sensor 17. A mass scale 30 may also be associated with seat 5.

Seat damper assembly 12 may provide a damping force for seat suspension control system 6. Seat damper assembly 12 may include a sliding piston within a cylinder, the cylinder selectively filled with a hydraulic fluid or air via a mechanical valve, electromechanical valve, a hydraulic valve, or any other controllable valve as known in the art. It is also contemplated that seat damper assembly 12 may include a magnetorheological (MR) fluid type damper, where magnetorheological fluid is controlled by a electromagnet to control the damping characteristics, i.e., stiffness or softness, of seat damper assembly 12.

Position sensor 16 may determine a position of seat 5, for example, the relative position or displacement between seat 5 and base 10 and responsively deliver a position signal to processor 18. It should be appreciated that a variety of known types of position sensors may be capable of determining and transmitting a signal based on the relative position or displacement between seat 5 and base 10, and that any conventional type of position sensor may be employed. For example, position sensor 16 may include a linear variable differential transformer. The linear variable differential transformer may measure the linear displacement of seat 5 from base 10.

Speed sensor 17 may be associated with seat 5 and base 10 and may determine a seat 5 velocity indicative of the relative velocity between seat 5 and base 10. Speed sensor 17 may then responsively deliver a speed signal to processor 18. It should be appreciated that a variety of known types of speed sensors may be capable of determining and transmitting a signal based on the relative velocity between seat 5 and base 10, and that any conventional type of speed sensor may be employed. For example, speed sensor 17 may include a velocity transducer configured to measure velocity of seat 5 relative to base 10.

Mass scale 30 may be configured to detect the combined mass of seat 5 and an operator seated on seat 5. Mass scale 30 may include any scale known in the art configured to deliver a mass value of seat 5 and the operator to processor 18. It should be appreciated that mass scale 30 may be calibrated to compensate for the additional weight applied to mass scale 30 contributed by spring 13, seat damper assembly 12, speed sensor 17, and position sensor 16, and also calibrated to compensate for the spring force of spring 13 and damping force of seat damper assembly 12 acting on seat 5. Mass scale 30 may include, for example, a spring scale configured to measure mass based on a distance a spring deflects under a load.

In response to an initial vibration, acceleration, or excursion of seat 5 caused by machine 2 or an external input, seat suspension control system 6 may dampen the initial displacement as seat 5 moves toward first physical end stops 8, 8' or second physical end stops 9, 9' by increasing damping of seat damper assembly 12 so as to isolate and prevent travel guides 14, 14' and seat 5, and thus the operator, from impact with first physical end stops 8, 8' or second physical end stops 9, 9'. It is also contemplated that seat damper assembly 12 may remain soft in response to an initial vibration. That is, the excursion of seat 5 may be isolated without increasing the damping of seat damper assembly 12.

Figure 3:
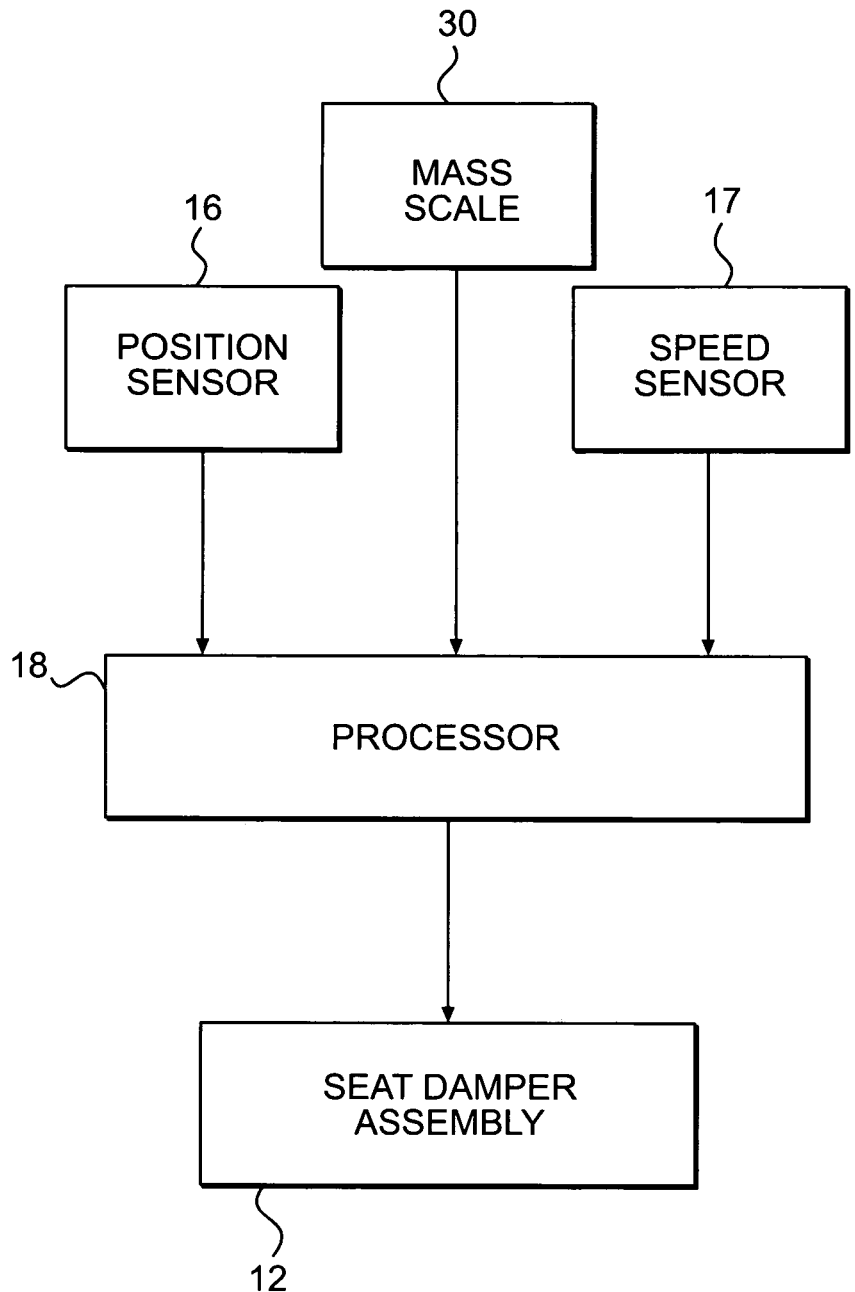
FIG. 3 is a diagrammatic illustration of a processor of the vibration control system according to an exemplary disclosed embodiment.

As shown in the exemplary embodiment of FIG. 3, processor 18 may receive position signals from position sensor 16, speed signals from speed sensor 17, and the mass value from mass scale 30 and may control seat damper assembly 12. As seat 5 deviates from set position 19 (as shown in FIG. 2), processor 18 may signal seat damper assembly 12 to vary the damping to return seat 5 back to set position 19. For example, and as also shown in FIG. 2, as seat 5 moves toward first physical end stops 8, 8' or second physical end stops 9, 9' due to an initial displacement, processor 18 may signal seat damper assembly 12 to provide an increase in damping to prevent impact with first physical end stops 8, 8' or second physical end stops 9, 9.

Processor 18 may be configured to set virtual end stop positions along travel rails 15, 15' and vary the damping of seat damper assembly 12 to effectively minimize subsequent and excess motion on seat 5 as a result of an initial excursion and quickly return seat 5 and the operator to set position 19.

Figure 4:
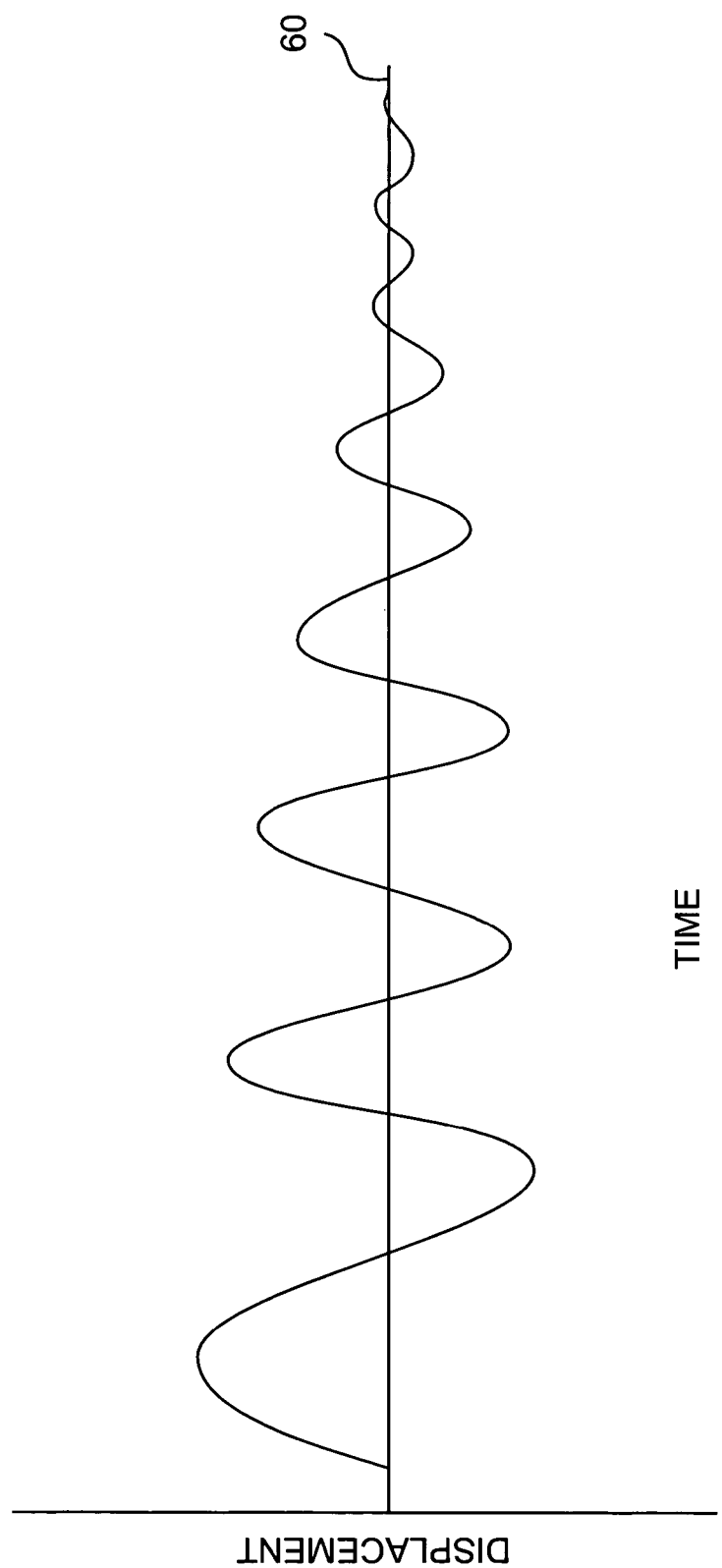
FIG. 4 is a displacement graph illustrating the vibration of an exemplary disclosed machine in response to an external input according to an exemplary disclosed embodiment.

FIG. 4 depicts an exemplary disclosed displacement graph of machine 2 in response to an external input, such as acceleration of machine 2 and/or the terrain of worksite 1. As illustrated in FIG. 4, machine 2 may be displaced, for example, oscillate up and down, from a natural ride position 60 in response to the external input. Natural ride position 60 may be a preset position of machine 2 at a height relative to worksite 1 when machine 2 experiences no external inputs, for example, when machine 2 is at rest and/or on flat terrain of worksite 1. In one embodiment, natural ride position 60 may be a position of the floor of cab 3 at a height relative to the surface of worksite 1 when machine 2 experiences no external inputs.

Figure 5:
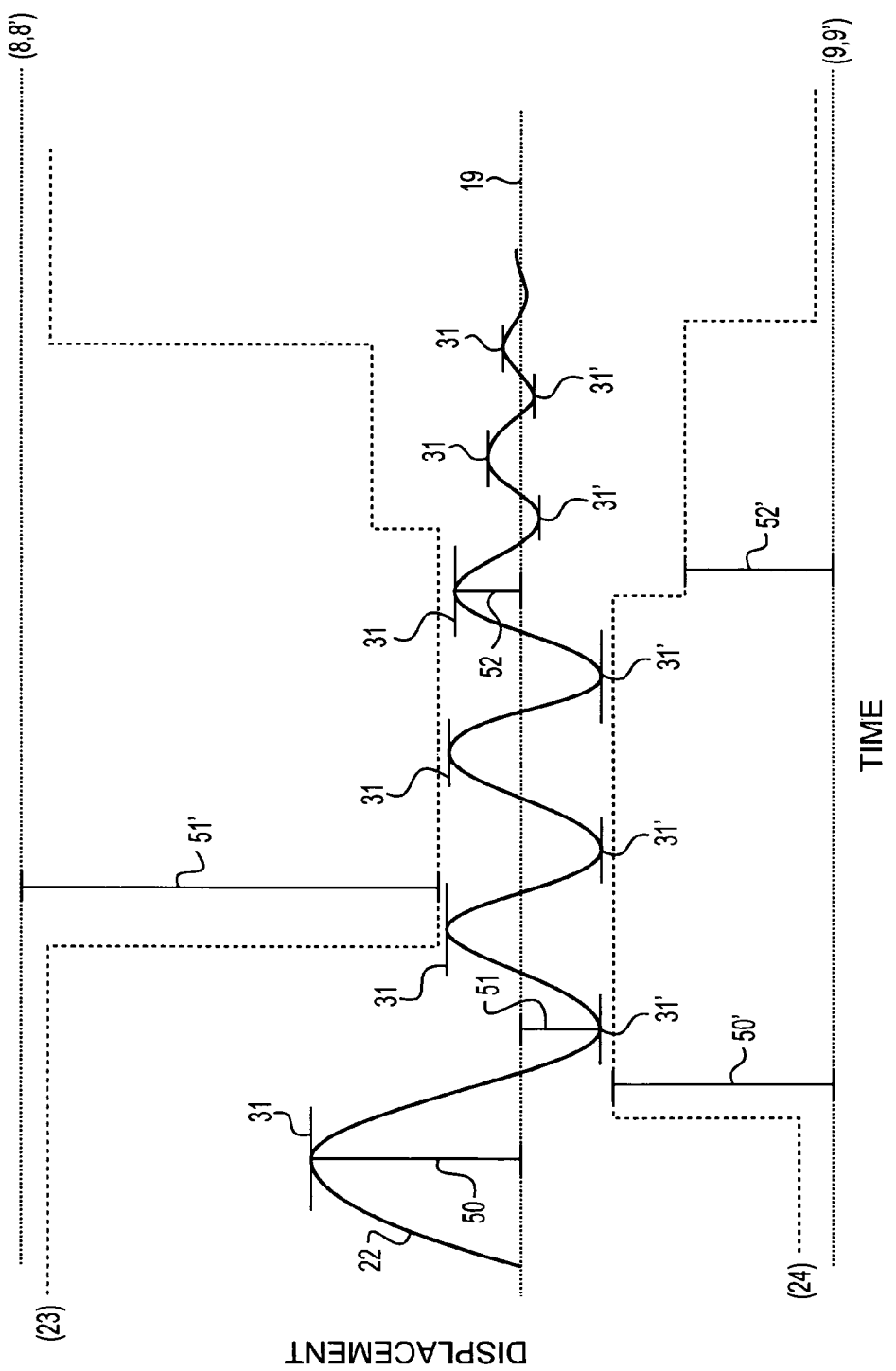
FIG. 5 is a displacement graph illustrating the vibration damping control logic according to an exemplary disclosed embodiment.

FIG. 5 depicts an exemplary disclosed displacement graph of seat 5 in response to the motion of machine 2, as depicted in FIG. 4. Processor 18 may initially set a first virtual end stop position 23 which may be closer to set position 19 than first physical end stops 8, 8', and a second virtual end stop position 24 which may be closer to set position 19 than second physical end stops 9, 9'. The initial positions of first virtual end stop position 23 and second virtual end stop position 24 may be, for example, predetermined positions stored within a memory unit of processor 18. When seat 5 experiences a vibration, an initial excursion 22 of seat 5 from set position 19 may be isolated by increasing the damping of seat damper assembly 12 so as to prevent seat 5 from reaching first virtual end stop position 23. Once the initial excursion 22 of seat 5 terminates, for example, when seat 5 has stopped moving, position sensor 16 may determine a displacement 31 of seat 5 from set position 19 and towards first virtual end stop position 23. Displacement 31 may include, for example, a distance 50 of the position of seat 5 from set position 19. Processor 18 then may determine second virtual end stop position 24 as a function of distance 50.

In one embodiment, processor 18 may determine an appropriate and corresponding position of second virtual end stop position 24 relative to set position 19 that is associated with distance 50. For example, processor 18 may utilize stored algorithms, equations, subroutines, look-up maps, and/or tables to calculate and determine a distance 50' from second physical end stop 9, 9' to set second virtual end stop position 24 based on distance 50 determined by position sensor 16. It is contemplated that the distance from second physical end stop 9, 9' from which second virtual end stop position 24 is adjusted to may vary depending on the magnitude of displacement 31 of seat 5 from set position 19. For example, larger displacements 31, and subsequently larger distances, from set position 19 may have a corresponding distance from second physical end stop 9, 9' that sets second virtual end stop position 24 closer to set position 19 than smaller displacements 31, and subsequently smaller distances, of seat 5 from set position 19.

As a result of seat spring 13, seat 5 may reverse direction and experience a displacement 31' from set position 19 and toward second physical end stop 9, 9'. As seat 5 moves toward second virtual end stop position 24, speed sensor 17 may detect the velocity of seat 5 and deliver a velocity signal to processor 18. Processor 18 may utilize the velocity signal and a mass value from mass scale 30 to determine the kinetic energy of seat 5 and the operator as seat 5 and operator approaches set position 19. The kinetic energy ($E_s$) may be computed from the mass value of seat 5 and the operator ($m_s$) and the velocity of seat 5 ($v_s$) by the equation:

$$E_s = \tfrac{1}{2} m_s v_s^2$$

To reduce the kinetic energy of seat 5 evenly and bring the velocity of seat 5 to zero, a target force may be determined and applied by seat damper assembly 12 over a distance substantially equal to the distance of seat 5 at displacement 31 to reach second virtual end stop position 24. Processor 18 may compute the target force (F) from the kinetic energy ($E_s$) and the distance (d) between the position of seat 5 at displacement 31 and second virtual end stop position 24 by the equation:

$$F = E_s / d$$

The target force (F) applied to seat 5 by seat damper assembly 12 may be substantially equivalent to the force for which seat 5 will reach and stop at second virtual end stop position 24.

Processor 18 may then determine a damping target for damper assembly 12 based on the target force to be applied to seat 5. Processor 18 may utilize stored algorithms, equations, subroutines, look-up maps, and/or tables to analyze the target force and determine a corresponding damping target for damper assembly 12. Processor 18 may signal seat damper assembly 12 to increase damping up to the damping target by, for example, adjusting the actuation of the valve of damper assembly 12. As damping increases towards the damping target, the force applied to seat 5 increases toward the target force. It is contemplated that the degree of actuation of the valve may correspond to the force applied by seat damper assembly 12. For example, the valve may selectively open and close to alter the flow of hydraulic fluid or air into the cylinder, thereby, changing the damping characteristics, i.e., stiffness or softness, of damper assembly 12.

It is also contemplated that processor 18 may limit a rate of change of the target force applied by seat damper assembly 12. For example, damping may increase toward the damping target non-linearly and the rate at which damping increases may be limited. Processor 18 may limit the slew rate of seat damper assembly 12, thereby, restricting seat damper assembly 12 from reaching a maximum rate of increase of damping. This may prevent large jerks of seat 5 and discomfort to the operator by providing smoother transitions as seat 5 departs from set position 19 and between first virtual end stop position 23 and second virtual end stop position 24.

Processor 18 may also be configured to adjust first virtual end stop position 23 based on the position of seat 5 relative to set position 19. Once seat 5 substantially ceases to move toward second physical end stop 9, 9', processor 18 may determine a distance between seat 5 position and set position 19. Processor 18 then may adjust first virtual end stop position 23 from first physical end stop 8, 8' as a function of the distance of seat 5 position from set position 19 and towards second virtual end stop position 24. For example, and as shown in FIG. 5, once the excursion of seat 5 from first virtual end stop position 23 terminates, for example, when seat 5 has stopped moving, position sensor 16 may determine a displacement 31' of seat 5 from set position 19 and towards second virtual end stop position 24. Displacement 31' may include, for example, a distance 51 of the position of seat 5 from set position 19. In a similar fashion, as described above, processor 18 may determine an appropriate, adjusted position of first virtual end stop position 23 relative to set position 19 that is associated with distance 51. For example, processor 18 may utilize stored algorithms, equations, subroutines, look-up maps, and/or tables to calculate and determine a distance 51' from first physical end stop 8, 8' to adjust first virtual end stop position 23 based on distance 51. It is also contemplated that the distance from first physical end stop 8, 8' from which first virtual end stop position 23 is adjusted to may vary depending on the magnitude of displacement 31' of seat 5 from set position 19. For example, larger displacements 31', and subsequently larger distances, from set position 19 may have a corresponding distance from first physical end stop 8, 8' that sets first virtual end stop position 23 closer to set position 19 than smaller displacements 31', and subsequently smaller distances, of seat 5 from set position 19. As discussed above, as seat 5 moves toward the adjusted first virtual end stop position 23, processor 18 may determine the damping target for seat 5 to stop at first virtual end stop position 23, and may signal seat damper assembly 12 to increase damping up to the damping target.

Therefore, seat suspension control system 6 may accommodate any operator-desired position of set position 19 and still effectively return the operator to set position 19 because first virtual end stop position 23 and second virtual end stop position 24 may be set and adjusted based on the displacements of seat 5 from set position 19 and regardless of the operator selected position of set position 19.

As the excursions of seat 5 begin to die down, as shown in the tail-end of the graph of FIG. 5, displacements 31, 31' may diminish and become smaller. As displacements 31, 31' become smaller, distances between seat 5 position and set position 19 decrease and processor 18 may adjust first virtual end stop position 23 and second virtual end stop position 24 as a function of the decreased distances. For example, a distance 52, which is smaller than, for example, distances 50 and 51, may be determined and utilized by processor 18 to adjust second virtual end stop position 24 for the subsequent excursion of seat 5 towards second physical end stop 9, 9'. In a similar fashion as discussed above, processor 18 may utilize stored algorithms, equations, subroutines, look-up maps, and/or tables to calculate and determine an appropriate distance 52' from second physical end stop 9, 9' to adjust second virtual end stop position 24 based on distance 52. In this case, because distance 52 corresponding to displacement 31 has diminished to a small displacement value within a predetermined range stored within memory unit of processor 18, second virtual end stop position 24 may be adjusted to a position associated with distance 52 which is closer to second physical end stop 9, 9'.

As excursions continue to diminish and displacement values become smaller, processor 18 may adjust first and second virtual end stop positions 23, 24 towards first physical end stop 8, 8' and second physical end stops 9, 9', respectively, until first and second virtual end stop positions 23, 24 are adjusted back to their initial positions near first physical end stop 8, 8' and second physical end stop 9, 9'. First and second virtual end stop positions 23, 24 then may adjust, as described above, in response to another larger excursion and displacement of seat 5.

The net effect of complementary first and second virtual end stop positions 23, 24 is that they may effectively limit the rattle space of the suspension system, and thus the operator, to a manageable range near set position 19 after initial excursion 22 of seat 5 is dampened and isolated.

INDUSTRIAL APPLICABILITY

The disclosed vibration control system 6 may be applicable to mobile machines requiring seat suspensions. It is understood, however, that the disclosed vibration control system 6 may be used on any machine or component to reduce or dampen vibrations. The example of a mobile machine seat suspension system is discussed to describe the features of the vibration control system; however, the details of the seat suspension system will be applicable to the use of such a vibration control system on various other machines or components where damping of vibrations is beneficial. For example, vibration control system 6 may serve to dampen and isolate a seat 5 from an initial excursion 22 and effectively minimize subsequent motions of seat 5. Limiting the subsequent motions of an initial excursion 22 may allow an operator on seat 5 to remain in control of a machine and reduce discomfort to the operator.

In operation, seat suspension control system 6 may set first and second virtual end stop positions 23, 24 closer to an operator selected set position 19 than first physical end stop 8, 8' and second physical end stop 9, 9' and control the damping of seat damper assembly 12 as seat 5 position moves towards first and second virtual end stop positions 23, 24. Therefore, the seat 5 position, and thus the operator, may be effectively returned to set position 19 following initial excursion 22 of seat 5.

Figure 6:
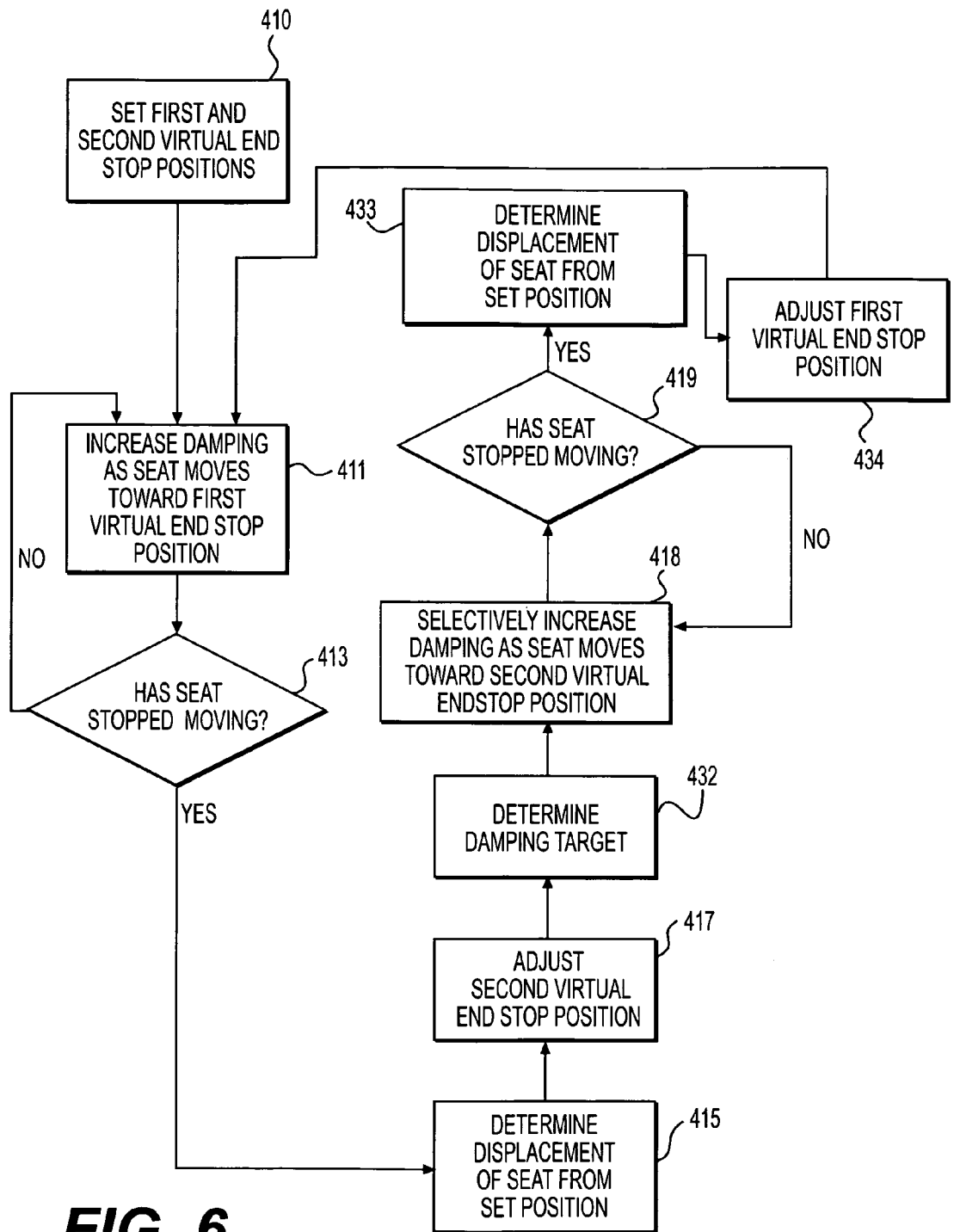
FIG. 6 is a flow chart illustrating the vibration control system logic according to an exemplary disclosed embodiment.

FIG. 6 is a block diagram illustrating how seat suspension control system 6 may limit and isolate subsequent and excess motion of seat 5 in response to initial excursion 22. Processor 18 may initially set first virtual end stop position 23 and second virtual end stop position 24, step 410. In response to initial excursion 22, processor 18 may signal the damping increase of seat damper assembly 12 as seat 5 moves toward first virtual end stop position 23 or second virtual end stop position 24, preventing a collision between travel guides 14, 14', and thus seat 5, with first physical end stops 8, 8' or second physical end stops 9, 9', step 411. Although it is disclosed that initial excursion 22 may be isolated by increasing the damping of seat damper assembly 12, it is also contemplated that initial excursion 22 may be isolated without increasing the damping of seat damper assembly 12.

Speed sensor 17 may determine if the seat 5 has stopped moving towards first physical end stop 8, 8', step 413. If seat 5 has not stopped moving, the damping of seat damper assembly 12 may continue to increase, step 411. If seat 5 has stopped moving, position sensor 16 may determine displacement 31 of seat 5 from set position 19, step 415. Processor 18 then may determine and adjust second virtual end stop position 24 as a function of a distance of seat 5 position from set position 19, step 417.

As seat 5 moves toward second virtual end stop position 24, processor 18 may determine a damping target for damper assembly 12 to stop seat 5 at second virtual end stop position 24, step 432. Processor 18 then may signal seat damper assembly 12 to selectively increase damping up to the damping target, step 418, where the increase in damping force is slew rate limited. In a similar manner as discussed above, speed sensor 17 may determine if seat 5 has stopped moving towards second physical end stop 9, 9', step 419. If seat 5 has not stopped, the damping of seat damper assembly 12 may continue to increase, step 418. If seat 5 has stopped moving, processor 18 may determine displacement 31' of seat 5 from set position 19 and towards second virtual end stop position 24, step 433. Processor 18 then may adjust first virtual end stop position 23 as a function of a distance of seat 5 position from set position 19 and towards second virtual end stop position 24, step 434. Processor 18 then may continue to adjust first virtual end stop position 23 and second virtual end stop position 24 and increase damping of seat damper assembly 12 based on displacements 31, 31'.

Employing seat suspension control system 6 to machines requiring a seat suspension may provide quick and accurate isolation of seat 5, and thus operators of the machines, in response to an initial displacement of seat 5. After the initial displacement of seat 5 is isolated, processor 18 may determine and set first and second virtual end stop positions 23, 24 to effectively return seat 5 and the operator to the operator selected set position 19, and thus control module 4. Because first and second virtual end stop positions may be set and updated based on a distance of seat 5 position from the set position 19, seat suspension control system 6 may accurately limit excess motion of seat 5 around set position 19, and thus improve operator comfort and the ability to control machine 2.

It will be apparent to those skilled in the art that various modifications and variations can be made to the vibration control system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A component vibration control system, comprising:
    a first physical end stop;
    a second physical end stop;
    a damper assembly;
    a position sensor configured to determine a component position; and
    a processor in communication with the position sensor and the damper assembly, the processor configured to:
        set a first virtual end stop position;
        regulate damping of the damper assembly as the component moves toward the first virtual end stop position;
        determine a first distance between the component position and a set position when the component has moved toward the first virtual end stop position; and
        determine a second virtual end stop position as a function of the first distance.

2. The component vibration control system of claim 1, wherein the processor is configured to increase the damping of the damper assembly as the component moves toward the first virtual end stop position and the second virtual end stop position.

3. The component vibration control system of claim 2, wherein the processor is configured to determine a target force of the damper assembly for the component to substantially reach the first virtual end stop position and the second virtual end stop position.

4. The component vibration control system of claim 3, wherein the processor is configured to limit a rate of change of the target force of the damper assembly.

5. The component vibration control system of claim 1, wherein the processor is further configured to determine a second distance between the component position and the set position when the component has moved toward the second virtual end stop position, wherein the processor is configured to adjust the first virtual end stop position as a function of the second distance.

6. The component vibration control system of claim 5, wherein the processor is further configured to determine a third distance between the component position and the set position when the component has moved toward the first virtual end stop position, wherein the processor is configured to adjust the second virtual end stop position as a function of the third distance.

7. The component vibration control system of claim 1, wherein the component is a seat.

8. A vibration control method, comprising:
    setting a first virtual end stop position;
    determining a component position;
    regulating damping as the component moves toward the first virtual end stop position;
    determining a first distance between the component position and a set position when the component has moved toward the first virtual end stop position; and
    determining a second virtual end stop position as a function of the first distance.

9. The method of claim 8, further including increasing the damping as the component moves toward the first virtual end stop position and the second virtual end stop position.

10. The method of claim 9, further including determining a target force of the damper assembly for the component to substantially reach the first virtual end stop position and the second virtual end stop position and limiting a rate of change of the target force of the damper assembly.

11. The method of claim 10, further including determining a second distance between the component position and the set position when the component has moved toward the second virtual end stop position, and adjusting the first virtual end stop position as a function of the second distance.

12. The method of claim 11, further including adjusting the second virtual end stop position as a function of the third distance.

13. The method of claim 11, wherein the component is a seat.

14. A machine, comprising:
    a component; and
    a vibration control system, including:
        a first physical end stop;
        a second physical end stop;
        a damper assembly;
        a position sensor configured to determine a component position; and
        a processor in communication with the position sensor and the damper assembly, the processor configured to:
            set a first virtual end stop position;
            regulate damping of the damper assembly as the component moves toward the first virtual end stop position;
            determine a first distance between the component position and a set position when the component has moved toward the first virtual end stop position; and
            determine a second virtual end stop position as a function of the first distance.

15. The machine of claim 14, wherein the processor is configured to increase the damping of the damper assembly as the component moves toward the first virtual end stop position and the second virtual end stop position.

16. The machine of claim 15, wherein the processor is configured to determine a target force of the damper assembly for the component to substantially reach the first virtual end stop position and the second virtual end stop position.

17. The machine of claim 16, wherein the processor is configured to limit a rate of change of the target force of the damper assembly.

18. The machine of claim 17, wherein the processor is configured to determine a second distance between the component position and the set position when the component has moved toward the second virtual end stop position, the processor being further configured to adjust the first virtual end stop position as a function of the second distance.

19. The machine of claim 18, wherein the processor is configured to determine a third distance between the component position and the set position when the component has moved toward the first virtual end stop position, the processor being further configured to adjust the second virtual end stop position as a function of the third distance.

20. The machine of claim 19, wherein the component is a seat.

\* \* \* \* \*

UNITED STATES PATENT AND TRADEMARK OFFICE
CERTIFICATE OF CORRECTION

| | |
|---|---|
| PATENT NO. | : 9,464,684 B2 |
| APPLICATION NO. | : 12/318250 |
| DATED | : October 11, 2016 |
| INVENTOR(S) | : Contratto et al. |

It is certified that error appears in the above-identified patent and that said Letters Patent is hereby corrected as shown below:

In the Claims

Column 10, Lines 17-19, Claim 12, delete "including adjusting the second virtual end stop position as a function of the third distance." and insert -- including determining a third distance between the component position and the set position when the component has moved toward the first virtual end stop position, and adjusting the second virtual end stop position as a function of the third distance. --.

Signed and Sealed this
Twenty-fourth Day of January, 2017

Michelle K. Lee
*Director of the United States Patent and Trademark Office*